UNITED STATES PATENT OFFICE.

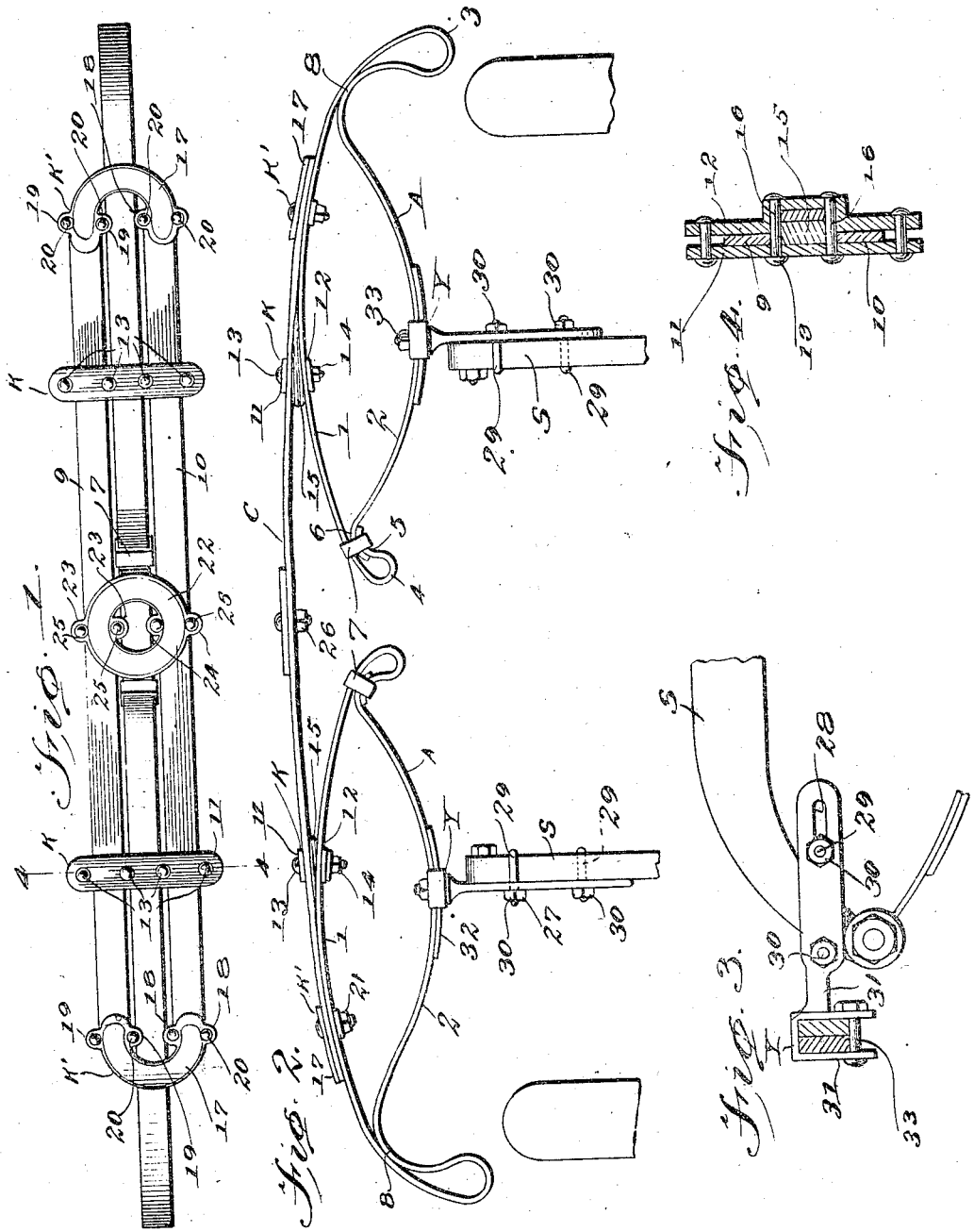

LOUIS H. B. HAND, OF HARVEY, ILLINOIS.

SPRING GUARD FOR VEHICLES.

1,424,014.　　　　Specification of Letters Patent.　　Patented July 25, 1922.

Application filed January 23, 1922. Serial No. 531,263.

*To all whom it may concern:*

Be it known that I, LOUIS H. B. HAND, a citizen of the United States, and a resident of Harvey, in the county of Cook and State of Illinois, have invented certain new and useful Improvements in Spring Guards for Vehicles, in which the following is a specification.

My invention relates to guards for vehicles, and it consists in the combinations, constructions and arrangements herein described and claimed.

An object of my invention is to provide a guard for vehicles which is constructed in such manner as to be capable of a maximum range of movement under stress for a guard of a given size without rupture or permanent set.

A further object of my invention is to provide a guard of the character described which is designed to effectively dissipate the shocks and jars received in service without communicating such shocks and jars to a supporting vehicle frame.

A further object of my invention is to provide a guard which can be applied to or dismounted from the frame of an automobile or like vehicle in a minimum of time and with the use of tools ordinarily available.

A still further object of my invention is to provide a guard which is strong and durable and is free from the bolt receiving openings and hinges ordinarily comprised in like devices.

Other objects and advantages will be apparent from the following description, and the novel features of the invention will be particularly outlined in the appended claims.

My invention is illustrated in the accompanying drawings, forming a part of this application, in which, Figure 1 is a front view of a practical embodiment of the invention, Figure 2 is a plan view showing the guard applied, Figure 3 is a view showing a portion of the supporting structure shown also in Figure 2 in side elevation and a portion of the guard in section, and Figure 4 is a section along the line 4—4 of Figure 1.

In carrying out my invention, I provide a pair of spring members A—A of general elliptical shape and a spring member C of general arcuate or bow-shape for connecting the elliptical spring members. The arc coinciding with the spring member C is struck by a radius of relatively great length.

Each of the elliptical spring members A is formed by preference of a single metallic bar having spring qualities and fashioned to provide reversely curved front and rear portions 1 and 2, respectively, merged one into the other at one end by a spring loop 3 which extends rearwardly of the major axis of the spring member A. The front member 1 at the end thereof opposite the loop 3 is formed to provide a hook portion 4 having the extremity thereof curved in a direction the reverse of the direction of curvature of the hook proper, as indicated at 5. The corresponding end portion of the back member 2 is disposed between the extremity of the hook portion 4 and the front portion 1, being curved or bent at 6 to lie contiguous to the extremity 5 of the hook. A clip 7 embraces the portions 5 and 6 of the hook and back portions as well as the confronting or adjacent portion of the front portion and holds these parts in assembled relation.

It is to be observed at this point that the front and back portions of each elliptical spring member A abut each other at the juncture of these portions with the portion 3, as indicated at 8.

The connecting spring member C comprises two similar bars 9 and 10 which are coextensive in length and are held in spaced edge-wise alinement by the clamps K—K and K'—K'. Each of the clamps K consists of a pair of clamping plates 11 and 12, each provided with a series of spaced openings therethrough adapted to receive bolts 13. The distance between adjacent openings through the clamping plates is substantially the same as the width of the bars 9 and 10 and of the front portions 1. The bolts 13 are projected through registering openings in such manner that adjacent bolts are disposed transversely of opposite edges of one of the bars 9, 10 or front portion 1, so that the spring member C will be attached to the front portion 1 of the elliptical spring members A—A when nuts 14 are screwed on the ends of the bolts 13. Wedge-shaped wooden cushion blocks 15 are arranged between the connected together parts of the spring member C and the elliptical spring members A—A and are secured in place by the bolts 13 which extend through openings 16 in the cushion blocks, as illustrated to advantage in Figure 4.

The spring member C is further attached to the elliptical spring members A by the clamps K', each of which consists of a front clamping plate 17 which by preference is semi-annular in conformation, as shown, and is provided at each end thereof with oppositely extending ears 18—18 and 19—19, all of said ears being in alinement. Bolts 20 projected through the ears 18—18 straddle the bar 10 adjacent to the ends thereof and other bolts 20 projected through the ears 19—19 straddle the bar 9 adjacent to the ends of the latter. The bolts projected through the adjacent ears at the opposite ends of the clamping plate 17 extend transversely of and in contact with the front portions 1 of the elliptical spring members A. Nuts 21 are screwed on the bolts 20 to maintain the parts just described in assembled position.

A reinforcing plate 22 is provided with pairs of ears 23—23 and 24—24 at diametrically opposed points and bolts 25 projected through such ears straddle the bars 9 and 10 intermediately of their length. The plate 22 is held in contiguous relation to the bars 9 and 10 by means of nuts 26 threadedly engaged with the bolts 25.

It is important to note that the spring member C is attached to the front portions 1 of the elliptical spring members A—A intermediately of the length of the latter and that each of the spring members A is connected at spaced apart points with the spring member C.

A pair of bracket arms X—X having integral yoke portions Y—Y at their outer ends provide means for attaching the spring members A—A to supporting members S—S, which may be parts of the frame of an automobile or like vehicle. Each of the bracket arms X is provided with an opening 27 therethrough and with a slot or elongated opening 28 therethrough somewhat nearer to the rear end thereof than the opening 27 and in alinement with the latter. Obviously, a bracket arm X may be secured to supports S of different sizes when bolts 29 carried by the latter are projected through the openings 27 and 28 and nuts 30 are screwed on the ends thereof.

The yoke portion Y is formed to provide a pair of spaced apart parallel arms 31—31 adapted to straddle the back portions 2 of the elliptical spring members A—A and the reinforcing or stiffening bars 32 arranged contiguous thereto intermediately of their length. Bolts 33 are projected through the lower ends of the arms 31—31 and the lower edges of the embraced portions 2 and 32 rest upon such bolts, whereby the elliptical spring members A—A will be held against displacement relatively to the supports S—S.

It will thus be observed that my improved guard includes three separate spring members formed of imperforate elements, whereby a maximum strength is assured with bars of a given size and made of a given material, and that such spring members are connected together and to the supporting parts of a vehicle or the like to which attached without the inherent strength of the spring members being impaired or lessened in the slightest by reason of the engagement of the fastening or attaching means therewith.

If desired, appropriate advertising matter or the like may be produced upon the stiffening plate 22 and the end clamping plates 17, as shown in the drawings.

Obviously, my invention is susceptible of embodiment in forms other than that described herein and I therefore consider as my own all modifications and adaptations of the form of the device shown and described, which do not depart from the spirit and scope of the invention as disclosed in the foregoing and as outlined in the appended claims.

What I claim is:

1. A guard comprising a pair of spring members of general elliptical shape each having a secondary loop at an end thereof, means connecting the spring members for maintaining the latter in spaced relation, and other means for attaching the spring members to a support, such as a vehicle frame.

2. A guard comprising a pair of elliptical spring members, each having a secondary loop at an end thereof, a longitudinal spring member for connecting the elliptical spring members one with the other, and means for clamping the longitudinal member adjacent to its opposite ends to the elliptical spring members.

3. A guard comprising a pair of elliptical spring members, each having a secondary loop at an end thereof, a longitudinal spring member for connecting the elliptical spring members one with the other, and means for clamping the longitudinal member adjacent to its opposite ends to the elliptical spring members intermediately of the length of the latter.

4. A guard comprising a pair of elliptical spring members, each having a secondary loop at an end thereof, each having reversely curved front and back portions diverging from the ends of the loop toward the transverse medial line of the spring member an additional spring member of general arcuate or bow-shape, means for clamping the end portions of the second named spring member to the front portions of the elliptical spring members intermediately of the latter, and means for attaching the back portions of the elliptical spring members to a support.

5. A guard comprising a pair of spring members of general elliptical conformation, a spring member of general arcuate or bow-shape, means for clamping the end portions of the arcuate spring member to the elliptical spring members intermediately of the length of the latter and at spaced apart points, and cushion blocks interposed between the connected together portions of the elliptical spring members and the connecting spring member and maintained in position by said clamping means.

6. A guard comprising a pair of spring members of general elliptical shape, each of said spring members including imperforate front and back portions merged one into the other at one end of the said member by an integral loop portion thereof, a connecting spring member, means for clamping the ends of the connecting spring member to the front portions of the elliptical spring members intermediately of the length of the latter, and means engaging the back portions of the elliptical spring members intermediate of the length thereof for attaching the latter to spaced apart supports.

7. A guard comprising a pair of spring members of general elliptical shape, each of said spring members including imperforate front and back portions merged one into the other at one end of the said member by an integral loop portion thereof, a connecting spring member, means for clamping the ends of the connecting spring member to the front portions of the elliptical spring members intermediately of the length of the latter, and means engaging the back portions of the elliptical spring members intermediate of the length thereof for attaching the latter to spaced apart supports of varying size.

8. In a device of the character described, a spring member of general elliptical shape, said spring member being formed of a single metallic bar having inherent spring qualities and being bent to provide reversely curved front and back portions diverging from the opposite ends thereof and being merged one into the other at one end thereof by an integral loop portion, and means for securing the opposite ends of said front and back portions together.

9. In a device of the character described, a spring member of general elliptical shape, said spring member comprising front and back members connected at one end by an integral loop portion in such manner that the front and back portions are contiguous with respect to each other adjacent to the points at which merged into said loop portion and said loop portion extends rearwardly of the major axis of said elliptical spring member, and means for connecting the ends of the front and back portions remote from the loop portion together.

10. In a device of the character described, a spring member of general elliptical conformation and comprising reversely curved front and back portions merged one into the other at one end by a loop portion, said front portion being formed at its outer end to provide a hook portion and said back portion being formed at its end adjacent to the hook portion to lie between the extremity of the hook portion and the body of the front portion, and a clip holding the extremities of the hook and back portion against displacement relatively to each other and to the front portion of the spring member.

LOUIS H. B. HAND.